(12) United States Patent
Houston

(10) Patent No.: US 11,985,192 B2
(45) Date of Patent: *May 14, 2024

(54) SYNCHRONIZED CONTENT LIBRARY

(71) Applicant: Dropbox, Inc., San Francisco, CA (US)

(72) Inventor: Drew Houston, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/994,615

(22) Filed: Nov. 28, 2022

(65) Prior Publication Data
US 2023/0090977 A1  Mar. 23, 2023

Related U.S. Application Data

(63) Continuation of application No. 17/187,924, filed on Mar. 1, 2021, now Pat. No. 11,516,288, which is a (Continued)

(51) Int. Cl.
*H04L 67/1095* (2022.01)
*H04L 67/06* (2022.01)
*H04L 67/1097* (2022.01)

(52) U.S. Cl.
CPC .......... *H04L 67/1095* (2013.01); *H04L 67/06* (2013.01); *H04L 67/1097* (2013.01)

(58) Field of Classification Search
CPC . H04L 67/06; H04L 67/1097; H04L 67/1095; H04L 67/20; H04M 2203/554; H04M 2242/40; G06F 17/30174
See application file for complete search history.

(56) References Cited

U.S. PATENT DOCUMENTS

| 5,584,012 A | 12/1996 | Kojima et al. |
| 6,453,390 B1 | 9/2002 | Aoki et al. |

(Continued)

FOREIGN PATENT DOCUMENTS

| EP | 1452975 A2 | 9/2004 |
| EP | 1647908 A2 | 4/2006 |

(Continued)

OTHER PUBLICATIONS

Non-Final Office Action from U.S. Appl. No. 16/389,117, mailed Jul. 23, 2020, 13 pages,.

(Continued)

*Primary Examiner* — Esther B. Henderson
(74) *Attorney, Agent, or Firm* — Polsinelli PC

(57) ABSTRACT

The disclosed technology addresses the need in the art for synchronizing a content library between a content management system and client devices. Each content item in a user's content library is stored on the content management system and a record of each change to the content library is recorded in a content journal. A client device transmits a synchronization request that a portion of the content journal representing unsynchronized changes be processed to update the content library on the client device. The synchronization request includes a content library identifier and a content journal number identifying the content entry in the content journal last processed by the client device. Synchronization commands are sent based on the content entries not processed by the client device. Updated synchronization data representing the processed content entries is sent to the client device after synchronization is completed.

19 Claims, 6 Drawing Sheets

| Content Pointer | Content Library Identifier | Content Journal Number | Content Path | Latest Flag | Directory Flag | Content Size |
|---|---|---|---|---|---|---|
| 0001 | 178 | 1 | /Readme.txt | True | False | 85 |
| Null | 178 | 2 | /Photos | True | True | 0 |
| 1002 | 178 | 3 | /Photos/Face.jpg | True | False | 9321 |

Related U.S. Application Data continuation of application No. 16/389,117, filed on Apr. 19, 2019, now Pat. No. 10,951,702, which is a continuation of application No. 15/189,938, filed on Jun. 22, 2016, now Pat. No. 10,291,702, which is a continuation of application No. 13/847,294, filed on Mar. 19, 2013, now Pat. No. 9,398,090.

(60) Provisional application No. 61/749,754, filed on Jan. 7, 2013.

(56) References Cited

U.S. PATENT DOCUMENTS

| | | | |
|---|---|---|---|
| 6,865,599 | B2 | 3/2005 | Zhang |
| 7,587,501 | B2 | 9/2009 | Stillion et al. |
| 7,650,432 | B2 | 1/2010 | Bosworth et al. |
| 7,707,231 | B2 * | 4/2010 | LaChapelle .......... G11B 27/034 707/804 |
| 7,822,793 | B2 | 10/2010 | Rawat et al. |
| 7,890,646 | B2 | 2/2011 | Khosravy et al. |
| 8,055,644 | B2 | 11/2011 | Crowley et al. |
| 8,095,495 | B2 | 1/2012 | Clark et al. |
| 8,156,074 | B1 | 4/2012 | Multer et al. |
| 8,443,040 | B2 | 5/2013 | Schauser et al. |
| 8,554,791 | B1 | 10/2013 | Lavin |
| 8,583,625 | B2 | 11/2013 | Peterson et al. |
| 8,825,597 | B1 | 9/2014 | Houston et al. |
| 9,264,780 | B1 | 2/2016 | Stoica et al. |
| 2002/0111959 | A1 | 8/2002 | Ching et al. |
| 2004/0039781 | A1 | 2/2004 | Lavallee et al. |
| 2004/0172425 | A1 | 9/2004 | Edelstein et al. |
| 2004/0210591 | A1 | 10/2004 | Hirschfeld et al. |
| 2005/0044108 | A1 | 2/2005 | Shah et al. |
| 2005/0044162 | A1 | 2/2005 | Liang et al. |
| 2005/0246389 | A1 | 11/2005 | Shah et al. |
| 2006/0117056 | A1 | 6/2006 | Havewala et al. |
| 2006/0179343 | A1 | 8/2006 | Kitamura |
| 2006/0184652 | A1 | 8/2006 | Teodosiu et al. |
| 2006/0224602 | A1 | 10/2006 | Rawat et al. |
| 2007/0100834 | A1 | 5/2007 | Landry et al. |
| 2007/0174246 | A1 | 7/2007 | Sigurdsson et al. |
| 2007/0180000 | A1 | 8/2007 | Mine et al. |
| 2007/0271310 | A1 | 11/2007 | Han et al. |
| 2009/0062947 | A1 | 3/2009 | Lydon et al. |
| 2009/0083441 | A1 | 3/2009 | Clark et al. |
| 2009/0254601 | A1 | 10/2009 | Moeller et al. |
| 2011/0166960 | A1 | 7/2011 | Kim |
| 2012/0109952 | A1 | 5/2012 | Reddy |
| 2012/0197998 | A1 | 8/2012 | Kessel et al. |

FOREIGN PATENT DOCUMENTS

| | | |
|---|---|---|
| WO | 2005024665 A1 | 3/2005 |
| WO | 2011031130 A1 | 3/2011 |

OTHER PUBLICATIONS

Notice of Allowance from U.S. Appl. No. 16/389,117, mailed Oct. 28, 2020, 5 pages.

Notice of Allowance from U.S. Appl. No. 17/187,924, mailed Aug. 18, 2022, 9 pages.

* cited by examiner

| Content Pointer | Content Library Identifier | Content Journal Number | Content Path | Latest Flag | Directory Flag | Content Size |
|---|---|---|---|---|---|---|
| 0001 | 178 | 1 | /Readme.txt | True | False | 85 |
| Null | 178 | 2 | /Photos | True | True | 0 |
| 1002 | 178 | 3 | /Photos/Face.jpg | True | False | 9321 |

FIG. 2

| Content Pointer | Content Library Identifier | Content Journal Number | Content Path | Latest Flag | Directory Flag | Content Size |
|---|---|---|---|---|---|---|
| 0001 | 178 | 1 | /Readme.txt | True | False | 85 |
| Null | 178 | 2 | /Photos | True | True | 0 |
| 1002 | 178 | 3 | /Photos/Face.jpg | False | False | 9321 |
| 1002 | 178 | 4 | /Photos/Face.jpg | True | False | -1 |

FIG. 3

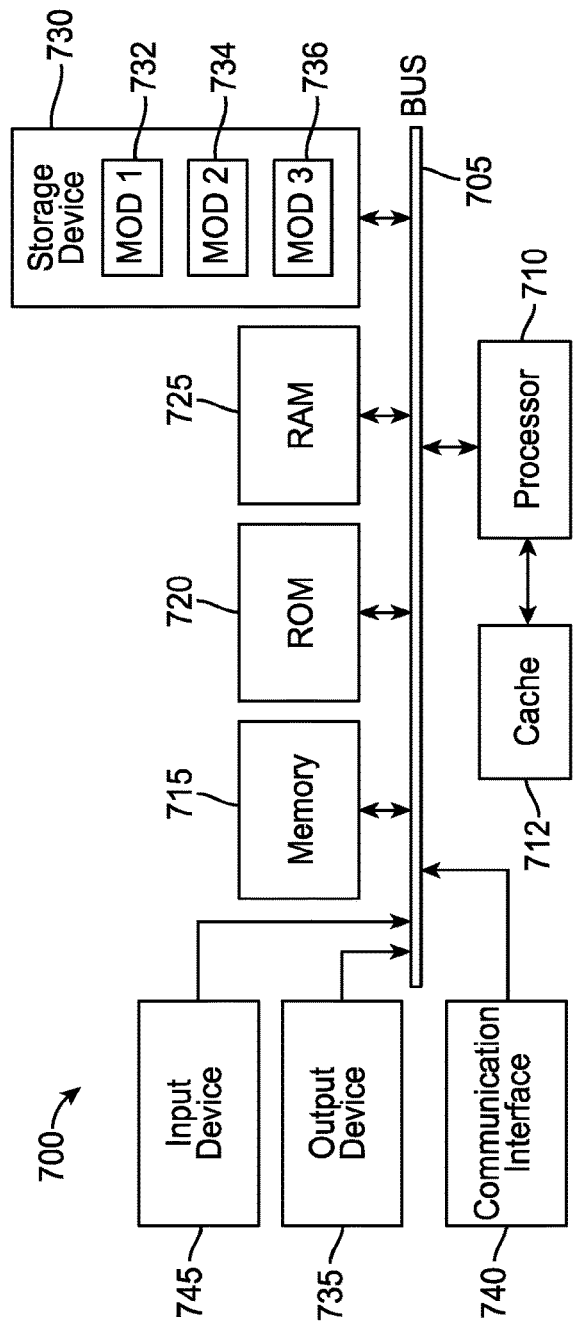
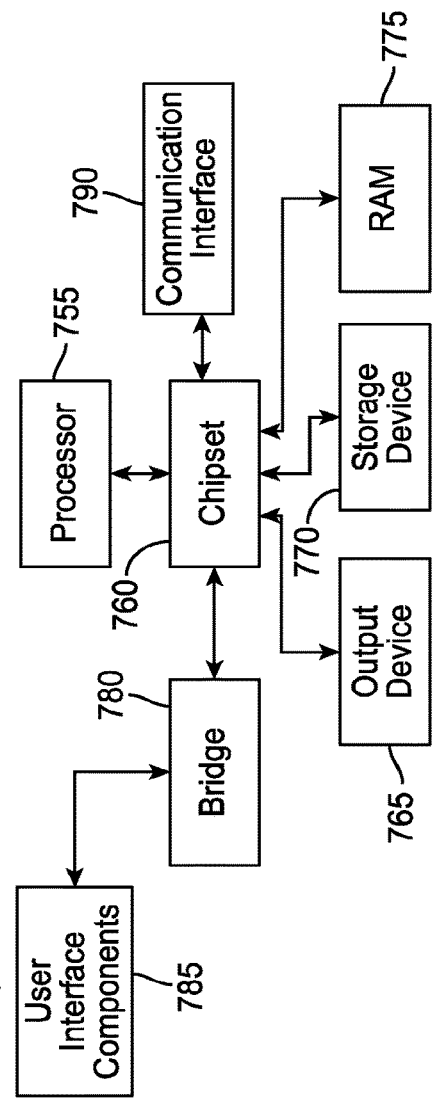

SYNCHRONIZED CONTENT LIBRARY

CROSS REFERENCE TO RELATED APPLICATIONS

This application is a continuation of and claims the benefit of U.S. application Ser. No. 17/187,924, filed on Mar. 1, 2021, entitled, "SYNCHRONIZED CONTENT LIBRARY", which is a continuation of and claims the benefit of U.S. application Ser. No. 16/389,117, filed on Apr. 19, 2019, entitled, "SYNCHRONIZED CONTENT LIBRARY", which is a continuation of and claims the benefit of U.S. patent application Ser. No. 15/189,938 filed on Jun. 22, 2016, entitled, "SYNCHRONIZED CONTENT LIBRARY", which is a continuation of and claims the benefit of U.S. patent application Ser. No. 13/847,294 filed on Mar. 19, 2013, entitled, "SYNCHRONIZED CONTENT LIBRARY", which claims the benefit of priority under 35 U.S.C. § 119(e) to U.S. Provisional Patent Application No. 61/749,754, filed on Jan. 7, 2013; entitled, "SYNCHRONIZED CONTENT LIBRARY", all of which are hereby expressly incorporated herein by reference in their entireties.

TECHNICAL FIELD

The present technology pertains to a content library, and more specifically pertains to synchronizing a content library across a content management system and client devices.

BACKGROUND

Online content management systems enable users to store content items online so that the content items can be accessed from a variety of client devices. These online content management systems enable a user to upload content items to the online content storage and access the stored content items from the online storage. While these systems do allow the content item to be accessed from multiple client devices, a network connection is required to access the stored content items. To access the content items when a network connection is unavailable, a user must maintain a copy of the content library locally on a client device.

Ensuring that the content library is synchronized between the content storage system and client devices is often left to the user and can result in inconsistent content libraries and lost changes. For example, to maintain a synchronized content library across the content storage system and two client devices, changes made to a content item on a first client device must be uploaded to replace the content item on the content management system and then downloaded to the second client device to replace the content item stored on the second client device. If the user makes revisions to the content item stored on the second client device without first downloading the revised content item, the changes made to the content item on the first client device will not be reflected in the version of the content item stored on the second client device, and vice versa.

Further, content management systems that do manage synchronization of the content libraries are inefficient and time consuming, often replacing the entire content library to synchronize between two devices. Accordingly, a need exists for an improved method of synchronizing a content library across a content management server and client devices.

SUMMARY

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out hereinafter. These and other features of the disclosure will become more fully apparent from the following description and accompanying drawings, or can be learned by the practice of the principles set forth herein.

Disclosed are systems, methods, and non-transitory computer-readable storage media for synchronizing a content library between a content management system and client devices. A content library can consist of any number of individual content items. A content item can be any type of file such as a document, text file, audio file, video file, etc. Further, a content item can be a folder or other mechanism of grouping content items together.

The disclosed technology enables a user to store content items in a content library that can be accessed and modified from multiple client devices. Changes made to the content library when accessed from a first client device, including adding, deleting or modifying content items, can be synchronized across other client devices. Synchronizing can include transmitting changes made to the content library stored on a first client device to the content management system and other client devices having the content library. A user can thus modify their content library from a first client device and any changes made to the content library from the first user device can be synchronized such that the content library reflects the changes when accessed from a second client device.

To accomplish this, the disclosed technology can be configured to store each content item in a user's content library in a content storage of the content management system. As the content items are added, deleted, or modified, the content management system can record each change to the content library as a separate content entry in a content journal associated with the content library. Each time the content library is accessed from a client device, the client device can send a synchronization request to the content management system requesting that any new content entries recorded since the last time the content library was accessed by the client device be processed to update the content library on the client device. Thus, the content library can be synchronized to indicate any changes made to the content library from a different client device.

To insure that only new content entries are processed when the content library is accessed by a client device, the content management system can be configured to store synchronization data on the client device including a content library identifier identifying the content library to be synchronized and a content journal number identifying the content entry in the content journal last processed by the client device. The stored synchronization data can be transmitted to the content management system along with the synchronization request. In some embodiments, the synchronization request stored on the client device can be encoded so that the client device cannot access the content library identifier and content journal number. For example the synchronization data can be an opaque data type such as an opaque string.

The content management system can use the received synchronization data to identify a portion of the content journal representing the state of the content journal known to the client device as well as any content entries representing changes that are unknown to the client device. The content management system can be configured to analyze the content entries representing changes that are unknown to the client device to transmit any necessary synchronization commands to the client device. A synchronization command can include data from the content entry that can be used by the client device to make the change to the content library on the client device represented by the content entry.

In some embodiments, the content management system can exclude the change represented by a content entry from being sent to the client device as a synchronization command. For example, content entries that are determined to not be the latest content entry associated with a specific content item can be excluded because the change represented by the content entry is outdated and irrelevant. Further, content entries indicating that a content item has been deleted from the content library can be excluded when the synchronization request is the first synchronization request received from the client device because the content item to be deleted was never added to the content library on the client device.

Upon synchronizing the content library on a client device with the content library on the content management system, the content management system can be configured to transmit updated synchronization data to the client device. In some embodiments, the updated synchronization data can be encoded prior to being transmitted to the client device.

BRIEF DESCRIPTION OF THE DRAWINGS

The above-recited and other advantages and features of the disclosure will become apparent by reference to specific embodiments thereof which are shown in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2 shows an exemplary content journal;

FIG. 3 shows an example of using content size to indicate that a content item has been deleted from a content library;

FIGS. 7A-7B show exemplary possible system embodiments.

DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

The disclosed technology addresses the need in the art for synchronizing a content library between a content management system and client devices. A content library can consist of any number of individual content items. A content item can be any type of file such as a document, text file, audio file, video file, etc. Further, a content item can be a folder or other mechanism of grouping content items together.

The disclosed technology can enable a user to store content items in a content library that can be access and modified from multiple client devices. Changes made to the content library when accessed from a first client device, including adding, deleting or modifying content items, can be synchronized across other client devices used to access the content library. Synchronizing can include changing the content library stored on a client device such that the content library is the same when accessed on each client device. A user can thus manage their content library from a first client device and any changes made to the content library from the first user device can be synchronized such that the content library reflects the changes when accessed from a second client device.

To accomplish this, the disclosed technology can be configured to store each content item in a user's content library in a content storage of the content management system. As the content items are added, deleted, or modified, the content management system can record each change to the content library as a separate content entry in a content journal associated with the content library. Each time the content library is accessed from a client device, the client device can request that any new content entries recorded since the last time the content library was accessed by the client device be processed to update the content library on the client device. Thus, the content library is synchronized to indicate any changes made to the content library from a different client device.

To insure that only new content entries are processed when the content library is accessed by a client device, the content management system can be configured to store synchronization data on the client device including a content library identifier identifying the content library to be synchronized and a content journal number identifying the content entry in the content journal last processed by the client device. Thus any content entries created after the content entry identified by the content journal number can be processed to synchronize the content library on the client device with the content library on the content management system.

Figure 1:
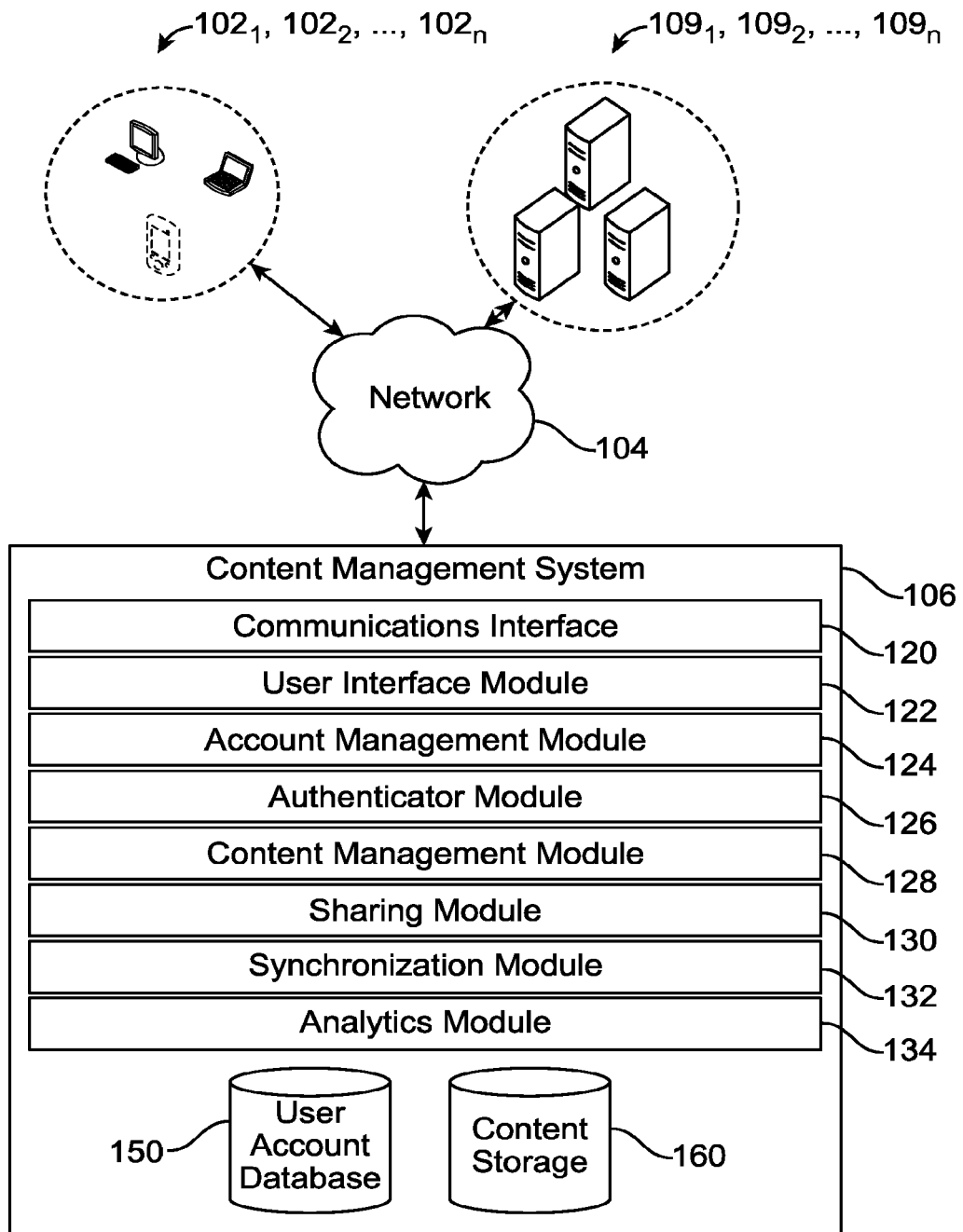
FIG. 1 shows an exemplary configuration of devices and a network in accordance with the invention.

An exemplary system configuration 100 is shown in FIG. 1, wherein electronic devices communicate via a network for purposes of managing a synchronized content library across multiple client devices. The system can be configured for use on a wide area network such as that shown in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_1$. In some embodiments, the client-side application can include a content management system specific component.

For example, the component can be a stand-alone application, one or more application plug-ins, and/or a browser extension. However, the user can also interact with content management system 106 via a third-party application, such as a web browser, that resides on client device $102_1$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to synchronize a content library between the content management system 106 and client devices 102. Further, the content management system can make it possible for the user to perform a variety of content management tasks, such as retrieve, modify, browse, and/or share the content items. For example, client device $102_i$ can upload content items to content management system 106 via network 104. The content items can later be retrieved or modified from content management system 106 using the same client device $102_i$ or some other client device $102_j$.

To access the various content management services, content management system 106 can be configured to enable a user to create a user account with the content management system 106. For example, content management system 106 can include an account management module 124 configured to prompt a user to enter account information to create a new user account. Account information can include any variety of information about the user including a user's name, address, phone number age, etc. In some embodiments, the only account information necessary to create a user account can be a user name and password.

The account management module 124 can be configured to create a new user account using received account information. This can include communicating with a user account database 150 configured to store user account profiles for registered users. The account management module 124 can be configured to create a new user account profile in the user account database 150 using the received account information.

Further, the account management module 124 can be configured to generate a unique content library identifier associated with the newly created account and store the content library identifier in the user account profile. The content library identifier can be used to identify content items as part of the user's content library. This concept is described in further detail below.

A user account profile can also include account management information, such as account type, e.g. free or paid; usage information, e.g. file edit history; maximum storage space authorized; storage space used; content storage locations; security settings; personal configuration settings; content sharing data; etc.

The user account enables a user to store content items, such as documents, text files, audio files, video files, etc., from one or more client devices 102 authorized on the user account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content items via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include communications interface 120 for interfacing with various client devices 102, and can interact with other content and/or service providers $109_1$, $109_2$, ..., $109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. For example, the sharing module 130 can generate a custom network address, such as a uniform resource locator (URL), which allows any web browser to access shared content in the content management module 106 without any authentication. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

The content management system 106 can include a content management module 128 configured to create and update a content journal used to manage a content library and synchronize the content library between the content management system 106 and client devices 102. A content journal can be a list of content entries, each associated with a content item in the content library. Each content entry can include information used to identify the content item and describe the current state of the content item, including the location of the content item, the name and file hierarchy of the content item and the content library to which the content item belongs.

The content management module 128 can be configured to add a new content entry to the content journal for each content item added to the content library. For example, the content management module 128 can be configured to receive input indicating that a new content item has been added to the content library and, in response to the input, create a new content entry associated with the new content item added to the content library.

In some embodiments, the content management module 128 can be configured to modify an existing content entry associated with a content item upon a user making a change to the content item, such as changing the content items name, location, content, etc. For example, the content management module 128 can be configured to access the content entry associated with the content item and modify the content entry to reflect the change made to the content item.

In some embodiments, the content management module 128 can be configured to create a new content entry for every change that occurs in regards to the content library. Each content entry, therefore, can represent an addition, deletion or modification of a content item. Therefore, multiple content entries can be associated with a single content item, however only one content entry can indicate the latest state of the content item in the content library.

Thus, if a content item in the content library is changed to give the content item a new name, the content management module 128 can create a new content entry associated with the same content item that indicates the modified current state of the content item, i.e. the new name. The changed content item can thus be associated with two content entries, the old content entry indicating the original name of the content item and the new content entry indicating the new name of the content item.

In some embodiments, the content management module 128 can be configured to delete the old content entry upon creating a new content entry associated with the content item. In some embodiments, however, the content management module 128 can be configured to keep the old content entry and the new content entry associated with the content item. This allows a history of the content library to be maintained for recording purposes.

In embodiments where old content entries are not deleted, the content management module 128 can be configured to mark the new content entry as being the latest content entry associated with the content item and mark the old content entry as no longer being the latest content entry associated with the content item. For example, each content entry can include a latest flag indicating whether the content entry is the latest content entry associated with a content item and the content management module 128 can be configured to modify the latest flag associated with a content entry accordingly.

FIG. 2 shows an exemplary content journal including three content entries. Each content entry includes 7 data fields: a content pointer, content library identifier, content journal number, content path, latest flag, directory flag and content size.

The content pointer can be used to identify the location of the content item in the content storage 160. For example, the content pointer can include the exact storage address of the content item in the content storage 160. In some embodiments, the content pointer can point to multiple locations in the content storage 160, each of which contains a portion of the content item.

As shown, the content pointer of the first content entry has a value of 0001 indicating that the content item associated with the content entry is located at memory location 0001. The content pointer for the second content entry has a null value. This can be because the content item associated with the second content entry is a directory and thus is not associated with a file stored in the content storage. The content pointer of the third content entry has a value of 1002 indication that the content pointer associated with the third content entry is located at memory location 1002.

The content library identifier can identify the content library to which the content item is associated. The content library identifier can also be used to manage access to the content item. For example, only user accounts associated with the content library identifier can be allowed access to the content item. As shown, each of the three content entries is associated with the same content library identifier '178' indicating that the three content entries are all part of the same content library.

In some embodiments, the content journal can include content entries associated with various content library identifiers such that the content entries in the content journal are not all associated with the same content library. In some embodiments, a unique content journal can be maintained for each content library such that each entry in the content journal is associated with the same content library identifier and thus the same content library.

The content journal number can be a unique number identifying each content entry in the content journal. In some embodiments, the content journal number can also indicate an order in which the content entries are added to the content journal. For example, the content journal number assigned to the first content entry added to the content journal can be one and the content journal number can be incremented for each new content entry added to the content journal. In some embodiments, new content entries can be added to the bottom of the content journal. An example of this is shown in FIG. 2, where the content journal number for the first content entry is one, the content journal number of the second content entry is two and the content journal number of the third content entry is three.

The content path can identify the name of the content item as well as a folder hierarchy associated with the content item. For example, the content path can include a folder or path of folders in which the content item is placed as well as the name of the content item. As shown in FIG. 2, the content path of the first content entry is/ReadMe.txt. This indicates that the content item is named ReadMe.txt and the content item is located in the root folder.

The content path of the third content entry is/Photos/Face.jpeg. This can indicate that the content item is named Face.jpeg and the content item located in the Photos folder which is located in the root folder.

The content path can be used by a client device to present the content items in the content library in the appropriate folder hierarchy.

The latest flag can indicate whether the content entry is the latest content entry associated with the content item. For example, the latest flag can be a Boolean value set to true or 1 to indicate that the content entry is the latest content entry associated with the content item. The latest flag can be set to false or 0 to indicate that the content entry is not the latest content entry associated with the content item.

This can be useful in embodiments where the content management system is configured to keep the old content entry associated with a content item upon creating a new content entry associated with the content item. For example the content management module 128 can be configured to set the latest flag to true or 1 when creating a new content entry. The content management system can be further configured to change the latest flag of the old content entry associated with the content item to false or 0 to indicate that the old content entry is not the latest content entry associated with the content item.

The directory flag can indicate whether the content item is a directory or folder. For example, the directory flag can be a Boolean value that can be set to true or 1 to indicate that the content item is a directory. Alternatively, the directory flag can be set to false or zero to indicate that the content item is not a directory. As shown in FIG. 2, the first and second content entries have a directory flag value of false indicating that the content items associated with the first and third content entries, respectively, are not directories. The second content entry has a directory flag set to true, indicating that the content item associated with the second content entry is a directory.

The content size can indicate the size of the content item associated with the content entry. For example, the size can indicate the size of the content item in kilobytes. As shown, the first content entry has a content size of 85 indicating that the content item associated with the first content item has a size of 85 kilobytes. The second content entry has a content size of 0. This is because the second content entry is a directory, as indicated by the directory flag, and thus has no size.

In some embodiments, the content size can be used to indicate that a content item has been deleted from a content library. For example, the content management module 128 can be configured to set the content size to a negative value to indicate that the content item has been deleted.

FIG. 3 shows an example of using the content size to indicate that a content item has been deleted from a content library. As shown, the content journal includes the same entries as shown in FIG. 2, as well as a fourth entry. The fourth content entry is associated with the same content item as the third content entry. This is indicated by the fourth content entry having the same content library identifier (1002) and content path (/Photos/Face.jpg) as the third content entry.

As shown, the content size of the fourth content entry is −1, which indicates that the content item "Face.jpg" has been deleted. Further, the "latest flag" state associated with the third content entry has been changed to false to indicate that the third content entry is no longer the latest content entry for the content item Face.jpg. As shown, the content pointer of the fourth content entry has not been changed even though the content item has been deleted from the content library. This is because in some embodiments the content item can remain in the content storage when the content item is deleted from the content library. This can allow the content item to be recovered if necessary, for example, if the content item was deleted by accident.

In some embodiments, the content item can be deleted from the content storage when the content item is deleted from the content library and the content pointer can be set to null in the content entry indicating the deletion of the content item. Thus in this type of embodiment, the content pointer of the fourth content entry would be set to null rather than retain the value of a location in the content storage.

In some embodiments, the content item can be maintained in the content storage for a limited time after deletion and then be removed from the content storage. This allows a limited time for the content item to be recovered after being deleted from the content library.

Figure 4:
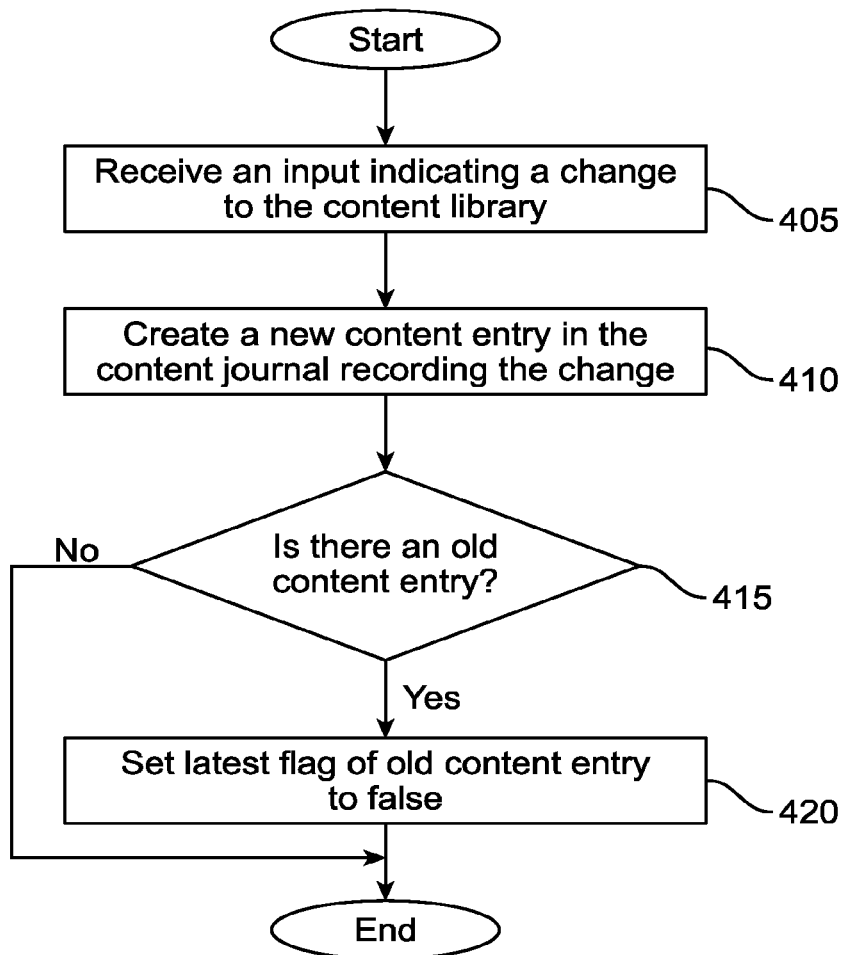
FIG. 4 shows an exemplary method embodiment of creating a content journal.

FIG. 4 shows an exemplary method embodiment of creating a content journal. The method begins at block 405, where a change input indicating a change to a content library is received. The change input can include an addition or deletion of a content item to the content library or a modification of a content item in the content library.

Upon receiving the change input, the method continues to block 410 where a new content entry recording the change to the content library is added to the content journal. In some embodiments, the content journal can be associated with a single content library such that all entries in the content library are recording changes made to the same content library. In some embodiments, the content journal can record changes to multiple content libraries.

The new content entry can include information describing the content item associated with the change input. For example, the new content entry can include a content library identifier that identifies the content library to which the content item belongs, the name and file hierarchy of the content item in the content library, a location of the content item in memory, etc. The new content entry can also include a content journal number indicating the sequential position in which the new content entry was added to the content journal. For example, if the content journal included 5 content entries prior to the new content entry being added to the content journal, the new content entry can have a content journal number of 6 to indicate that it is the $6^{th}$ content entry added to the content journal.

In embodiments in which the content journal is not exclusive to a single content library, the content journal number can indicate the sequential position in which the new content entry was added to the content journal in regards to the content library to which the content item belongs. For example, a content entry that is the $7^{th}$ content entry added to the content journal but only the $3^{rd}$ content entry added to the content journal in regards to a specific content library, can be given a content journal number of 3 to indicate that it is the third content entry in the content journal added in relation to the specific content library.

Further, the new content entry can also include a latest flag that is set to indicate that the new content entry is the latest content entry associated with the content item, i.e. no other content entry associated with the content item been created after the new content entry. In some embodiments, the latest flag can be a Boolean variable set to true to indicate that the new content entry is the latest content entry associated with the content item.

Upon creating the new content entry, the method continues to block 415 where it is determined if there is an old content entry in the content journal that is associated with the content item associated with the new content entry. An old content entry can be any content entry in the content journal, other than the new content entry, that is associated with the same content item as the new content entry.

If an old content entry associated with the content item does exist, the method continues to block 420 where the latest flag of the old content entry is set to indicate that the old content entry is not the latest content entry in the content journal associated with the content item. For example, the latest flag can be a Boolean value set to false to indicate that the old content entry is not the latest content entry associated with the content item. The method then ends. Likewise, if at block 415 it is determined that there is no old content entry associated with the content item, the method ends.

Returning to the discussion of FIG. 1, content management system 106 can be configured to use the content journal to synchronize the content library between content management system 106 and client devices 102. For example, client device $102_i$, can be configured to transmit a synchronization request to the content management system requesting that the content library on client device $102_i$ be synchronized with the content library stored on content management system 106. The synchronization request can include synchronization data including a content library identifier and a content journal number used by content management system 106 to identify content journal entries representing changes to the content library that are unknown to client device $102_i$ and have thus not been made to the content library on client device $102_i$. Further, content management system can send synchronization commands to client device $102_i$ instructing client device $102_i$ to make the appropriate changes to the content library on client device $102_i$. Content management system 106 can further transmit updated synchronization data to client device $102_i$ that reflects the completed synchronization.

Figure 5:
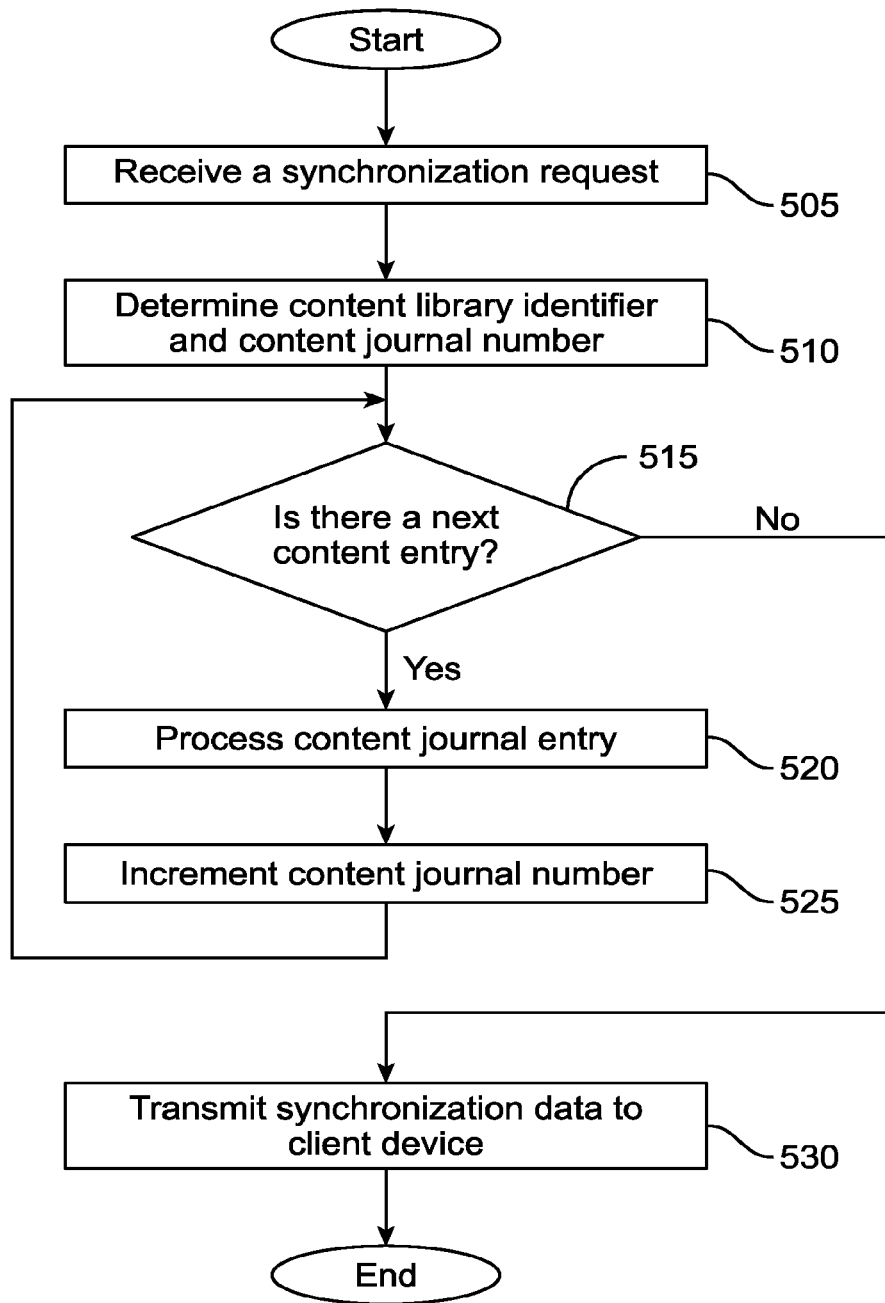
FIG. 5 shows an exemplary method embodiment of synchronizing a content library between the content management system and a client device.
Figure 6:
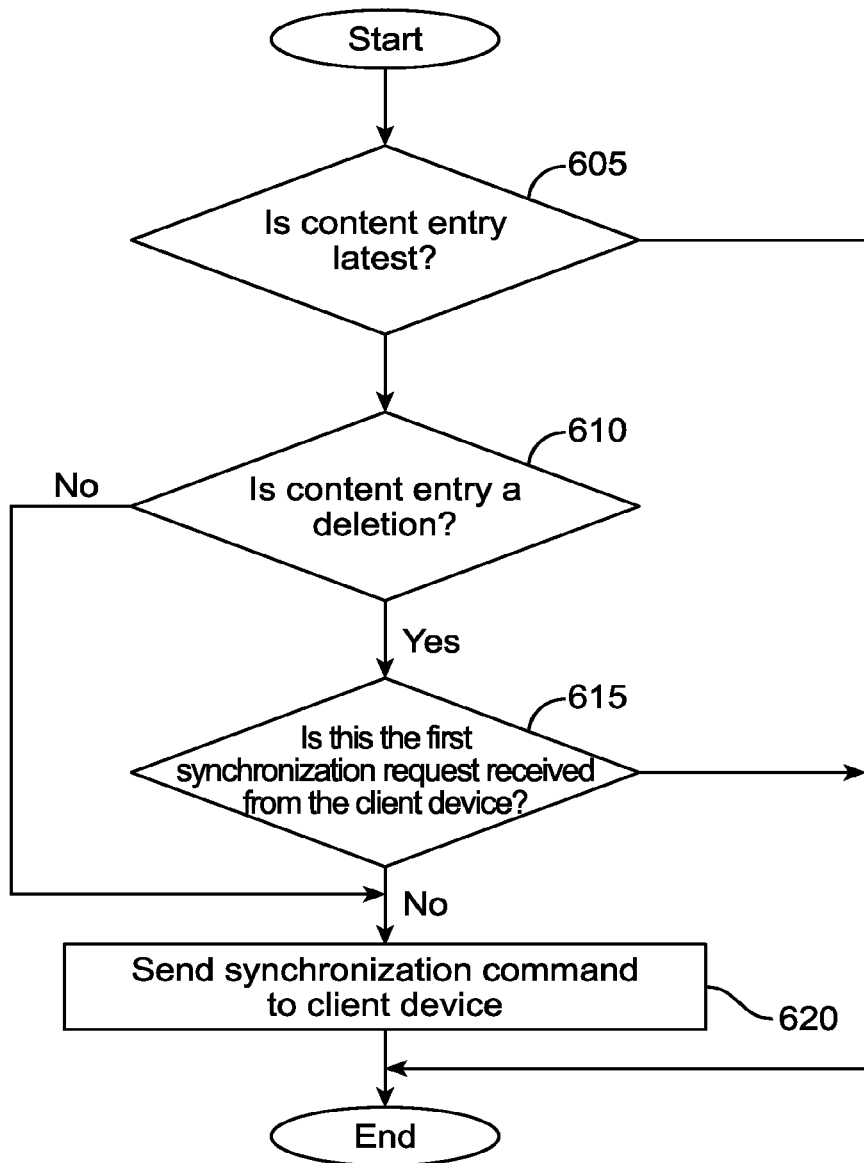
FIG. 6 shows an exemplary method embodiment of processing a content entry.

Using the content journal to synchronize the content library on client device $102_i$ with the content library on content management system 106 is discussed in further detail in FIGS. 5 and 6, which are discussed in view of FIG. 1.

FIG. 5 shows an exemplary method embodiment of synchronizing a content library between content management system 106 and client device $102_i$. The method begins at block 505, where a synchronization request is received at content management system 106. In some embodiments, the synchronization request can be a request originating from a client application on client device $102_i$ to synchronize the content library on client device $102_i$ with the content library on content management system 106.

In some embodiments, the synchronization request can include synchronization data identifying the content library and a position in the content journal. For example, content management system 106 can maintain a content journal that records changes made to the content library. Changes to the content library can include adding content items to the content library, deleting content items from the content library, and modifying content items in the content library. A new content entry can be added to the content journal for each change made to the content library. For example, content entries can be added to the content journal as described in FIG. 4.

The synchronization data included in the synchronization request can thus include a content library identifier and a content journal number, as described in FIG. 4. The content library identifier can identify a content library to be synchronized on client device $102_i$ and the content journal number can be a sequential position in the content journal associated with the content library that represents the latest state of the content library known to client device $102_i$ and to which client device $102_i$ has been previously synchronized. For example, the content entry identified by the content journal number can indicate the most recent change to the content library that the content library on client device $102_i$ has been updated to reflect.

Thus the content journal number received in the synchronization request indicates a portion of the content journal that represents a state of the content library that is already known to client device $102_i$ and that the content library on client device $102_i$ has been synchronized to reflect. The content journal number received in the synchronization request can also be used to identify a portion of the content journal that represents changes to the content library unknown to client device $102_i$ and that the content library on client device $102_i$ has not been synchronized to reflect. For example, the content entry identified by the content journal number can represent the content entry last processed by client device $102_i$ as a result of the previous synchronization request made by client device $102_i$. Thus, all content entries added to the content journal prior to the content entry identified by the content journal number, represent changes known to client device $102'$ and that have already been synchronized on client device $102_i$. Further, all content entries added to the content journal after the content entry identified by the content journal number, represent changes that occurred after the previous synchronization request made by client device $102_i$.

In some embodiments, the synchronization data can be received in an encoded format. For example, it may be beneficial to provide limited information to client device $102_i$ about how the content library is maintained by content management system 106. In view of this goal, the synchronization data stored on client device $102_i$ can be in an encoded format such that the content library identifier and the content journal number included in the synchronization data cannot be accessed by client device $102_i$. For example, in some embodiments, the synchronization data can be received as an opaque data type such as an opaque data string.

Upon receiving the synchronization request, the method continues to block 510 where content management system 106 can determine the content library identifier and content journal position included in the synchronization request. For example, content management system 106 can decode the received synchronization data to determine the content library identifier and the content journal position.

The method then continues to block 515 where content management system 106 can determine if there is a next content entry in the content journal in sequential order after the content entry identified by the content journal number. For example, if the content journal number is 5, content management system 106 can determine if there is a content journal entry with a content journal number of 6.

If content management system 106 determines that there is a content journal entry after the content entry identified by the content journal number, the method continues to block 520 where content management system 106 can process the next content journal entry. This is described in further detail in FIG. 6.

Upon content management system 106 processing the next content entry, the method continues to block 525 where content management system 106 can increment the content journal number to indicate that the previously unprocessed content journal entry has been processed. For example, the content journal number can be incremented to identify the content journal entry that was processed in step 520. Thus the incremented content journal number indicates the updated portion of the content journal entry synchronized with the client device.

The method then returns to block 515 where content management system 106 can determine whether there is a next content entry that has not been synchronized based on the incremented content journal number.

If at block 515 content management system 106 determines that there is no next content entry, and thus all the content entries associated with the content library in the content journal have been synchronized with client device $102_i$, the method continues to block 530 where content management system 106 can transmit updated synchronization data to client device $102_i$. For example, the content library identifier and an updated content journal number indicating the final content entry synchronized with client device $102_i$ can be transmitted to client device $102_i$. In some embodiments, content management system 106 can encode the synchronization data prior to transmitting the synchronization data to client device $102_i$ so that client device $102_i$ cannot access the content library identifier and the content journal number.

In some embodiments, the synchronization request received at block 505 can include multiple content library identifiers and a content journal position associated with each content library identifier. For example, a user can include multiple content libraries associated with their user account, such as a personal content library and a shared content library. The different content libraries can each be associated with a unique content library identifier and the synchronization data can include a content library identifier and a content journal number for each content library.

In this type of embodiment, method steps 510 through 530 can be repeated by content management system 106 for each content library identified by a content library identifier included in the synchronization request. Further, in some embodiments, the synchronization data transmitted to client device $102_i$ in step 530 can include the content library identifier and the associated updated content journal number for each content library identified by a content library identifier included in the synchronization request received at step 505.

FIG. 6 shows an exemplary method embodiment of processing a content entry as shown in block 520 of FIG. 5. As shown in FIG. 6, the method begins at block 605 where content management system 106 determines whether the content entry is the latest content entry associated with the content item. For example, the latest flag associated with the content entry can be used to determine if the content entry is the latest content entry associated with the content item. If the latest flag indicates that the content entry is the latest content entry associated with the content item, the method continues to block 610. If at block 605 content management system 106 determines that the content entry is not the latest content entry associated with the content item, the method ends.

At block 610 content management system 106 determines whether the content entry represents a deletion to a content item in the content library. In some embodiments, a content size variable representing the size of the content item associated with the content entry can be set to a negative number to indicate that the content item has been deleted from the content library. Alternatively, in some embodiments, the content entry can include a delete flag indicating whether the content entry represents a deletion of a content item. For example, the delete flag can be a Boolean variable that can be set to true to indicate that the content entry is a deletion of a content item, or the Boolean variable can be set to false to indicate that the content entry is not a deletion.

If at block 610 content management system 106 determines that the content entry is a deletion, the method continues to block 615 where content management system 106 determines whether the synchronization request received from client device $102_i$ is the first synchronization request received from client device $102_i$. In some embodiments, the content journal number received with the synchronization request can be used to determine if the synchronization request is the first synchronization request received from client device $102_i$. For example, if the content journal number identifies the first content entry added to the content journal, it can be determined that the synchronization request is the first synchronization request received from client device $102_i$. Alternatively, in some embodiments, a record of the synchronization requests received from client device $102_i$ can be kept by content management system 106 and the record can be checked to determine if the synchronization request is the first synchronization request received from client device $102_i$.

If content management system 106 determines that the synchronization request is not the first synchronization request received from client device $102_i$, the method continues to block 620 wherein content management system 106 transmits a synchronization command to client device $102_i$ based on the content entry. A synchronization command can include data included in the content entry that can be used by client device $102_i$ to make the change to the content library on client device $102_i$ represented by the content entry. The method then ends.

If at block 615 content management system 106 determines that the synchronization request is the first synchronization request received from client device $102_i$, the method ends without sending the synchronization command to client device $102_i$. This is because, based on the fact that a synchronization request has not been received from client device $102_i$, it is known that the content item deleted by the content entry has not been previously added to the content library on client device $102_i$. Thus transmitting a synchronization command to delete the content item would be an unnecessary step.

If at block 610 content management system 106 determines that the content entry does not represent a deletion, the method continues to block 620 where content management system 106 transmits a synchronization command is to client device $102_i$ based on the content entry. The method then ends.

FIG. 7A, and FIG. 7B show exemplary possible system embodiments. The more appropriate embodiment will be apparent to those of ordinary skill in the art when practicing the present technology. Persons of ordinary skill in the art will also readily appreciate that other system embodiments are possible.

FIG. 7A shows a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B shows a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that exemplary systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
receiving, by a content management system, a synchronization request from a client device, the synchronization request including a first position in a content journal having content entries representing a latest synchronization state for content items known to the client device;
adding, by the content management system based on the synchronization request, a new entry into the content journal to reflect a change to a first content item;
setting a latest flag in a latest version field to indicate that the new entry into the content journal is a most recent entry associated with the first content item in the content journal;
recording a second entry in the content journal for a second change corresponding to a second content item, wherein the second entry includes a second content path referencing the second content item, a second unique number for the second entry, and a flag in the latest version field to indicate that the second entry is the most recent for the second content item;
receiving, by the content management system, a second synchronization request from the client device, the second synchronization request including the unique number for a first entry in the content journal, the first entry in the content journal being the new entry for which data was previously sent to the client device; and
sending, by the content management system to the client device, data for the entries in the content journal after the first entry in the content journal, the data for the entries includes the second unique number for the second entry.

2. The method of claim 1, the method further comprising:
determining that an older content journal entry associated with the first content item exists in the content journal; and
removing the latest flag from the older journal entry.

3. The method of claim 1, further comprising:
sending, by the content management system to the client device, data for the entries in the content journal including the new entry in the content journal, the data for the entries includes a first unique number for the new entry.

4. The method of claim 1, wherein the second entry in the content journal is to add the second content item to the content management system, and a third entry is to delete the second content item from the content management system, the method further comprising:
after receiving the second synchronization request from the client device, determining that the second entry to add the content item, and the third entry to delete the content item can be omitted from the data for the entries in the content journal.

5. The method of claim 1, wherein the content journal stores changes for a plurality of content libraries, and the second synchronization request includes a content library identifier.

6. The method of claim 5, wherein the second synchronization request includes multiple content library identifiers and respective content journal positions associated with each content library identifier, the multiple content library identifiers identifying only a subset of the plurality of content libraries.

7. The method of claim 1, further comprising:
maintaining, by the content management system, the content journal, the content journal includes entries with fields for data descriptive of changes to corresponding content items stored in the content management system, the fields including at least: a content path field referencing a specific corresponding content item for which the data in a respective entry in the content journal pertains, a content journal number field containing a unique number for the respective entry in the content journal, where the content journal number is assigned in order as the entries are created in the content journal, and the latest version field indicating whether the respective entry is most recent for the corresponding content item in the content journal.

8. A non-transitory computer-readable storage medium comprising instructions stored thereon, that when executed by at least one processor, cause the at least one processor to:
maintain, by a content management system, a content journal that includes entries with fields for data descriptive of changes to corresponding content items stored in the content management system, the fields including at least: a content path field referencing a specific corresponding content item for which the data in a respective entry in the content journal pertains, a content journal number field containing a unique number for the respective entry in the content journal, where the content journal number is assigned in order as the entries are created in the content journal, and a latest version field indicating whether the respective entry is most recent for the corresponding content item in the content journal; and
record a first entry in the content journal for a change corresponding to a first content item, wherein the first entry includes a first content path referencing the first content item, a first unique number for the first entry, and a flag in the latest version field to indicate that the first entry is the most recent for the first content item.

9. The computer-readable storage medium of claim 8, wherein the instructions further configure the at least one processor to:
determine that an older journal entry associated with the first content item exists in the content journal; and
remove the latest flag from the older journal entry.

10. The computer-readable storage medium of claim 8, wherein the instructions further configure the at least one processor to:
send, by the content management system to a client device, the data for the entries in the content journal through the first entry in the content journal, the data for the entries includes the first unique number for the first entry.

11. The computer-readable storage medium of claim 10, wherein the instructions further configure the at least one processor to:
record additional entries in the content journal through a second entry in the content journal for a second change corresponding to a second content item, wherein the second entry includes a second content path referencing the second content item, a second unique number for the second entry, and a flag in the latest version field to indicate that the second entry is the most recent for the second content item;
receive, by the content management system, a synchronization request from the client device, the synchronization request including the unique number for the first entry in the content journal, the first entry in the content journal being the entry for which data was previously sent to the client device; and
send, by the content management system to the client device, data for the entries in the content journal after the first entry in the content journal has been recorded, the data for the entries including the second unique number for the second entry.

12. The computer-readable storage medium of claim 11, wherein the second entry in the content journal adds a third content item to the content management system, and a third entry in the content journal deletes the third content item from the content management system, wherein the instructions further configure a computer to:
after receiving the synchronization request from the client device, determine that the second entry to add the content item, and the third entry to delete the content item can be omitted from the data for the entries in the content journal.

13. The computer-readable storage medium of claim 11, wherein the content journal stores changes for a plurality of content libraries, and wherein the synchronization request includes a content library identifier.

14. The computer-readable storage medium of claim 13, wherein the synchronization request includes multiple content library identifiers and respective content journal positions associated with each content library identifier, the multiple content library identifiers identify only a subset of the plurality of content libraries.

15. A computing system comprising:
a processor; and
a memory storing instructions that, when executed by the processor, configure the system to:
receive, by a content management system, a synchronization request from a client device, the synchronization request including a first position in a content journal having content entries representing a latest synchronization state for content items known to the client device;
add, by the content management system based on the synchronization request, a new entry into the content journal to reflect a change to a first content item;
set a latest flag in a latest version field to indicate that the new entry into the content journal is a most recent entry associated with the first content item in the content journal;
record a second entry in the content journal for a second change corresponding to a second content item, wherein the second entry includes a second content path referencing the second content item, a second unique number for the second entry, and a flag in the latest version field to indicate that the second entry is the most recent for the second content item;
receive, by the content management system, a second synchronization request from the client device, the second synchronization request including the unique number for a first entry in the content journal, the first entry in the content journal being the new entry for which data was previously sent to the client device; and
send, by the content management system to the client device, data for the entries in the content journal after the first entry in the content journal, the data for the entries includes the second unique number for the second entry.

16. The computing system of claim 15, wherein the instructions are further effective to configure the computing system to:
   determine that an older content journal entry associated with the first content item exists in the content journal; and
   remove the latest flag from the older journal entry.

17. The computing system of claim 15, wherein the instructions are further effective to configure the computing system to:
   send, by the content management system to a client device, the data for the entries in the content journal including the new entry in the content journal, the data for the entries includes a first unique number for the new entry.

18. The computing system of claim 15, wherein the content journal stores changes for a plurality of content libraries, and the synchronization request includes a content library identifier.

19. The computing system of claim 15, wherein the instructions are further effective to configure the computing system to:
   maintain, by the content management system, the content journal, the content journal includes entries with fields for data descriptive of changes to corresponding content items stored in the content management system, the fields including at least: a content path field referencing a specific corresponding content item for which the data in a respective entry in the content journal pertains, a content journal number field containing a unique number for the respective entry in the content journal, where the content journal number is assigned in order as the entries are created in the content journal, and the latest version field indicating whether the respective entry is most recent for the corresponding content item in the content journal.

\* \* \* \* \*